April 14, 1953        J. C. COLLINS        2,634,572
DUMPING HAY RAKE
Filed March 30, 1949        3 Sheets—Sheet 1
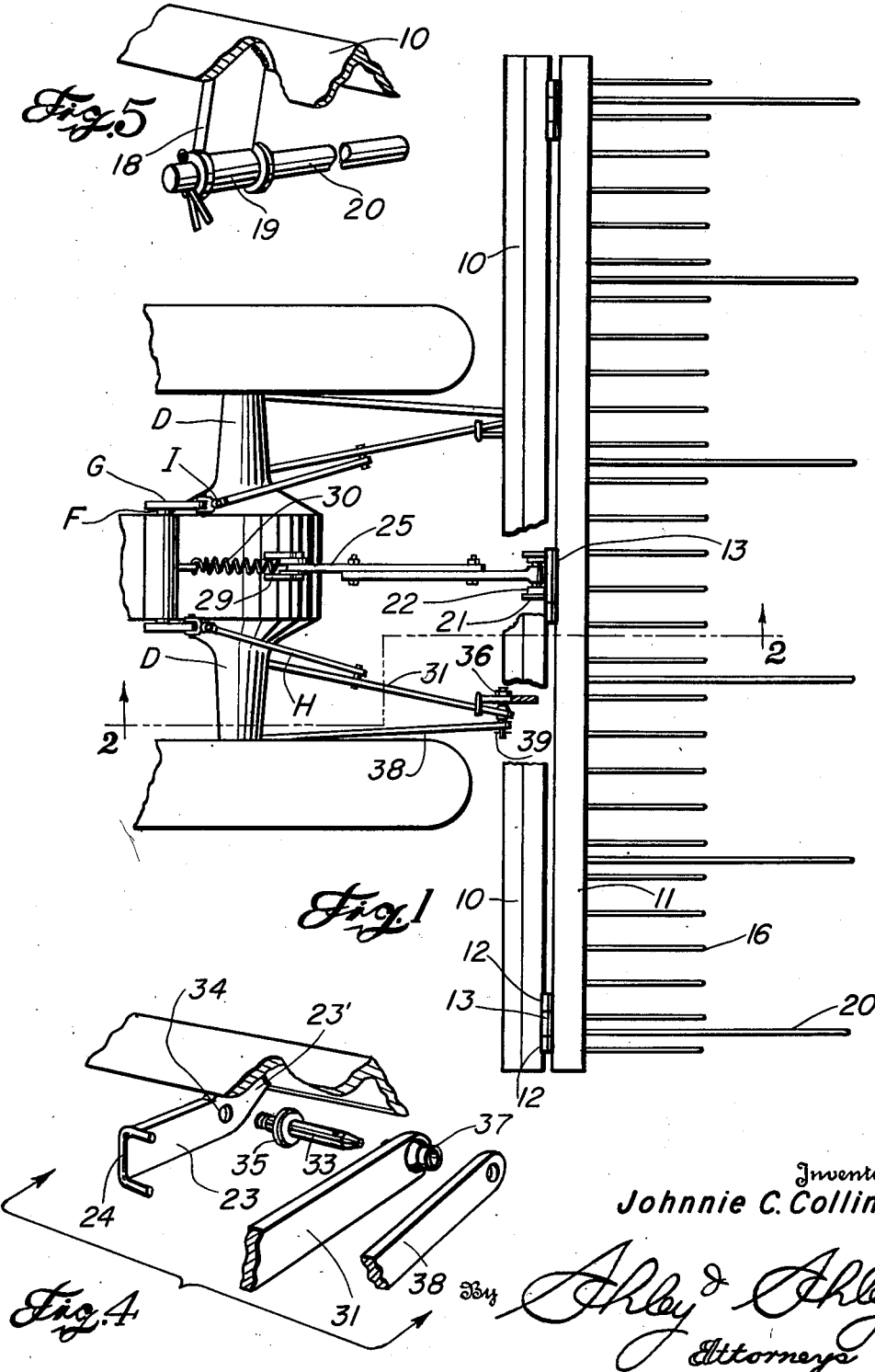
Inventor
Johnnie C. Collins
By Ahley & Ahley
Attorneys April 14, 1953 J. C. COLLINS 2,634,572
DUMPING HAY RAKE
Filed March 30, 1949 3 Sheets-Sheet 2
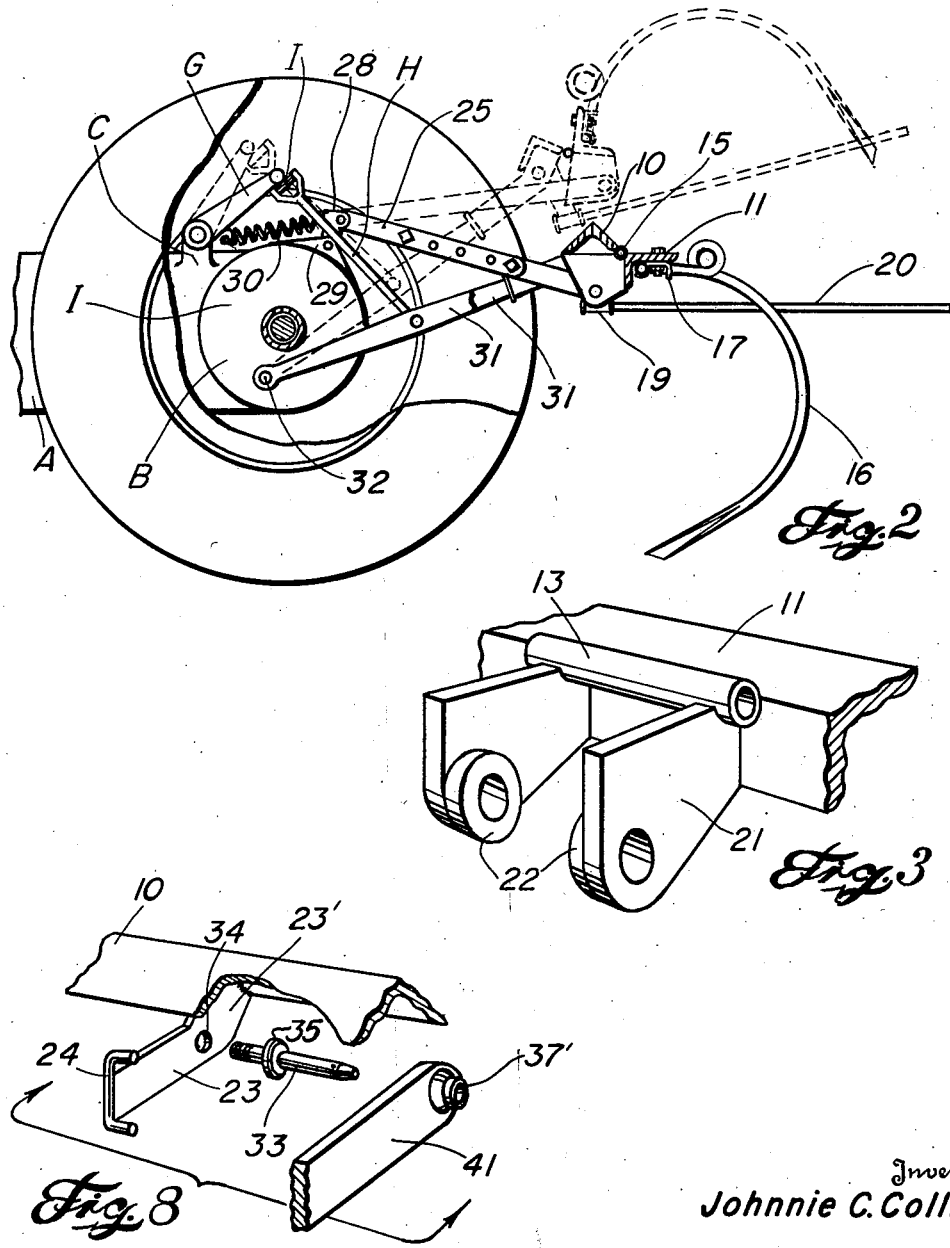
Inventor
Johnnie C. Collins April 14, 1953        J. C. COLLINS        2,634,572

DUMPING HAY RAKE

Filed March 30, 1949        3 Sheets-Sheet 3

Inventor
Johnnie C. Collins

By Ahley & Ahley
Attorneys

Patented Apr. 14, 1953

2,634,572

UNITED STATES PATENT OFFICE 2,634,572

DUMPING HAY RAKE

Johnnie C. Collins, Dallas, Tex., assignor to Servis Equipment Company, Dallas, Tex.

Application March 30, 1949, Serial No. 84,377

6 Claims. (Cl. 56—27)

This invention relates to new and useful improvements in dumping hay rakes.

One object of the invention is to provide an improved dumping hay rake of the type which is adapted to be carried on the rear end of a tractor.

Another object of the invention is to provide an improved dumping rake having means whereby it may be more readily and expeditiously mounted on a tractor.

A further object of the invention is to provide an improved dumping rake including, a pair of elongate, substantially parallel angle beams, each being triangular in cross section and each having longitudinal edges directly hinged together; to one of which beams the rake elements are attached and to both of which beams the lifting and dumping members are connected, whereby a more substantial and simple support is had.

Still another object of the invention is to provide a dumping rake having a plurality of members for easily and quickly attaching it to the lifting and dumping connections of a tractor, some of said members including a shank rigidly secured to one of the rake beams and having a shackle and a stud bolt making a simple attaching means.

A construction designed to carry out the invention will be hereinafter described, together with other features of the invention.

Figure 6:
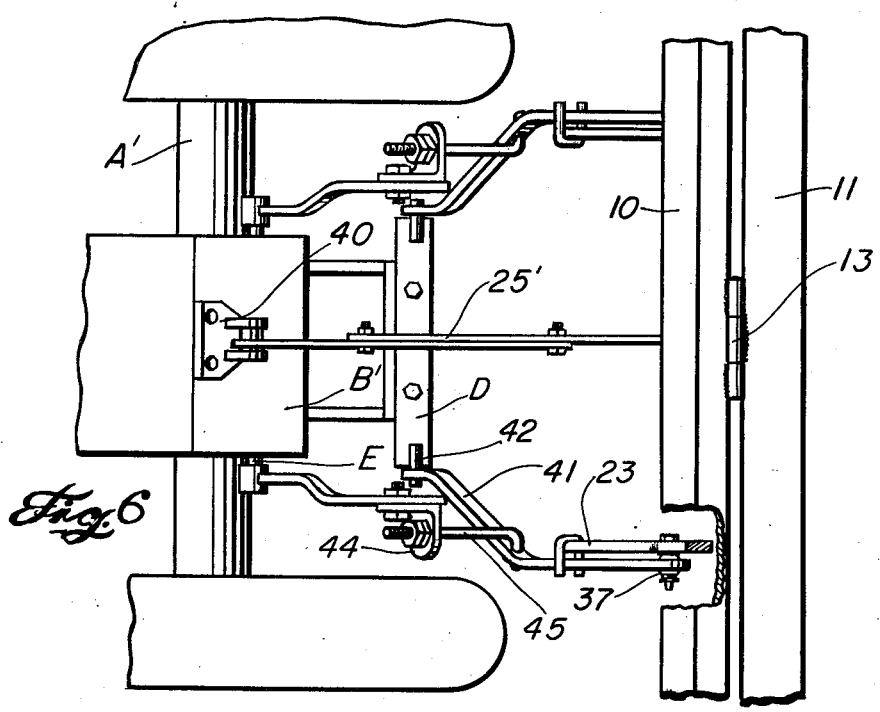
Figure 7:
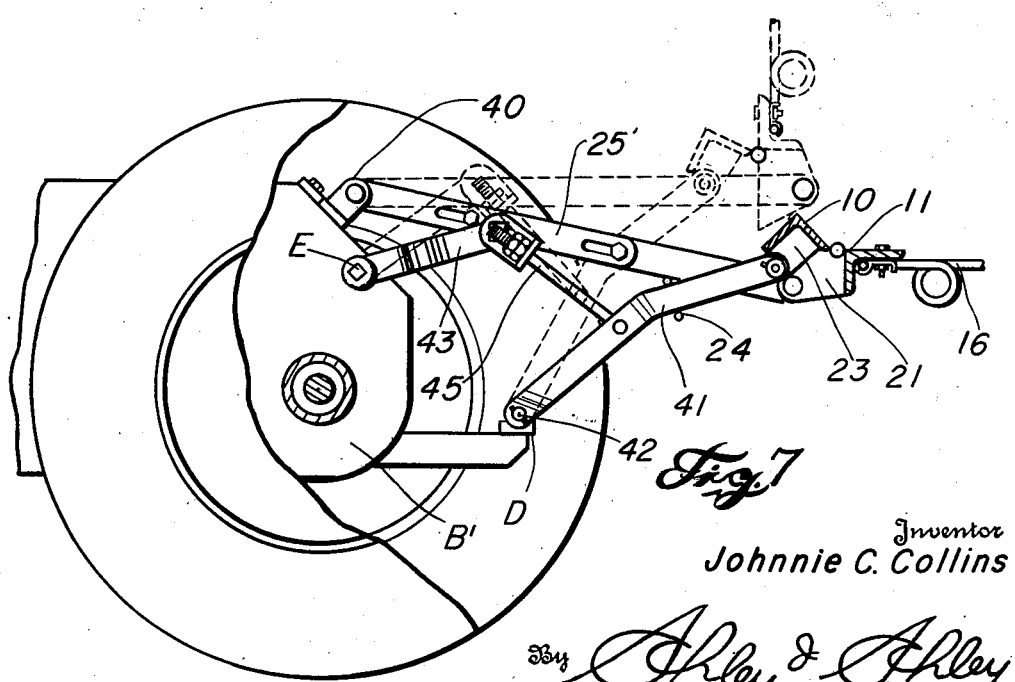

The invention will be more readily understood from a reading of the following specification and by reference to the accompanying drawings, wherein examples of the invention are shown, and wherein:

Fig. 1 is a plan view showing a dumping hay rake constructed in accordance with the invention attached to the rear portion of a tractor, certain of the parts being broken away to show underlying structure, Fig. 2 is a longitudinal vertical sectional view of the same along line 2—2 of Fig. 1, with parts broken away and showing the rake in dotted lines in dumping position, Fig. 3 is an enlarged, perspective view of the bracket portion of the rake head beam, Fig. 4 is a detached fragmentary perspective view of one of the lifting arm and mounting beam connections, Fig. 5 is a perspective view of one of the stripper-finger hangers, a portion of the mounting beam being broken away, Fig. 6 is an enlarged fragmentary view similar to Fig. 1, showing a modified form of tractor hitch, Fig. 7 is an end elevation of the form shown in Fig. 6, certain of the parts being in section and others being broken away, Fig. 8 is an enlarged fragmentary view similar to Fig. 4, showing the lifting arm connection for Figs. 6 and 7.

In the drawings the numeral 10 designates an elongate mounting beam, referred to hereinafter as a second elongate transverse supporting member, and 11, an elongate rake head beam, referred to hereinafter as a first elongate transverse supporting member. These beams or supporting members are substantially parallel, may be coextensive and each is triangular in cross-section. The mounting beam 10 has spaced hinge loops 12 welded along the edge of its rear leg or flange, at each end and at the center and each pair of loops receives in its space, a hinge loop 13 in longitudinal alinement with said loops. The loops 13 are welded to the apex edge of the head beam 11. The loops of each hinge are connected by a pintle 15. From the foregoing, it will be seen that the beams 10 and 11 are directly hinged to each other and provide a substantial and simple rake structure.

When in raking position, as shown in full lines in Fig. 1, the mounting beam 10 is inverted in the form of an equilateral triangle with the head beam 11 at right angles to the base of said mounting beam and also, inverted. The upper ends of the rake tines 16 are secured to the underside of the horizontal leg or flange of beam 11, in any suitable manner as by the ordinary clips 17.

At spaced positions on the beam 10, adjacent the ends and intermediate thereof, hangers 18 depend from said beam so as to occupy a substantially vertical position when the mounting beam is in the full line position of Fig. 1. The upper ends of the hangers are welded to the underside of the mounting beam and said hangers carry sleeves 19 at their lower ends, disposed at right angles to the longitudinal axis of the beam 10. Stripper rods or fingers 20 have their forward ends fastened in the sleeves and extend rearwardly under the beam 11 and between the tines 16 in the usual manner.

A pair of upright bracket plates 21 extend forwardly from the center of the rake head beam 11 and have their rear ends welded to the depending flange of said beam under the ends of the central hinge loop 13 (Fig. 3). Annular bearing bosses 22 are made integral with the inner faces of the plates at the lower ends thereof. On each side of the bracket plates and spaced therefrom are forwardly extending lifting shanks 23. Each shank has its rear end portion 23′ bent upwardly so as to extend up into the underside of the mounting beam 10, to which it is welded (Figs. 4 and 8). At the forward end of each shank a U-shaped shackle 24 is directed outwardly. The bracket plates 21 and the shanks 23 provide mounting means or adapters, whereby the rake may be readily connected to supports or attachments for suspending it from the rear ends of various types of tractors.

A top, swing link or actuating link 25 has an integral collar 26 at its rear end which carries a transverse pin 27 journaled at its ends in the bosses 22 of the bracket plates 21, whereby the link is hinged between said plates. The forward end of the link is pivoted to the upper end of a bell-crank lever 28 which has its lower end pivoted between ears 29 on the differential housing B of the tractor A. A coil spring 30 has its forward end secured to a lug C on said housing, while its rear end is attached to the lever 28. When the rake is in use the spring is under tension and resiliently sustains the lever 28 and the link 25. The link may be made in two overlapping bar sections $a$ and $b$ provided with equally spaced bolt holes $c$ adapted to receive bolts $d$ secured by nuts $e$, whereby its length may be varied to fit different installations; or which may be adjusted to vary the normal elevation of the rake.

Lifting arms or actuating links 31 have their forward ends pivoted on studs 32 on the axle housings D on opposite sides of the housing B. The rear ends of these arms pass through the shackles 24 on the outer sides of the shanks 23 and are journaled on stud bolts 33. Each stud bolt extends through an eye 34 in the adjacent shank at the intersection of the upturned end 23' and the body of said shank. An integral collar 35 on the stud bolt bears against the face of the shank and a nut 36 screwed onto the end of said bolt engages the inner face of said shank, whereby the stud bolt is fastened in place.

A ball socket 37 is journaled in the rear end of the arm 31 and is mounted on the stud bolt against the collar 35. This gives the arm a limited transverse rocking movement. Stabilizer links 38 have their forward ends pivoted to the brake housings E of the tractor in transverse alinement with the studs 32 and their rear ends confined on the bolts 33 by cotter keys 39. The link 25, arms 31 and link 38 are standard equipment in at least one make of tractor rake-attachment and the bracket plates 21 shanks 23 and stud bolts 33 are one means employed in this invention to mount and operate the rake.

It will be observed that the swing link 25 inclines downwardly and has its rear, lower end relatively crossing the upper rear end of the upwardly inclined lifting arms 31. A rock shaft F is mounted on the housing B and upwardly inclined lever-arms G fastened thereon. The upper end of each lever-arm is connected to the upper end of an inclined pitman H by a swivel I; while the lower end of each pitman is pivoted to the medial portion of the underlying arm 31.

The shaft F is rocked in the usual manner and the lever-arms G are swung upwardly and forwardly to the position shown in dotted lines in Fig. 2. This action causes the pitmans to swing or lift the arms 31 which in turn, because of their connection to the shanks 36, swing the beam 10 upwardly to the position shown in dotted lines in Fig. 2. The head beam 11, being hinged to the beam 10, is lifted by said beam 10 and the link 25 being pivoted to the beam 11 by means of the plates 21 swings the head beam 11, whereby the rake tines are elevated to the position shown in dotted lines in Fig. 2, and the rake is thereby dumped.

When the beams are elevated the link 25 not only swings the head beam 11 with relation to the beam 10, which causes the tines 16 to dump the load, but swings them upwardly with respect to the stripper rods 20, whereby hay and brush clinging to said tines is stripped therefrom. It is obvious that the hinging of the beams 10 and 11 to each other and the connection of the link and arms thereto, makes a compact and simple rake mounting which is easily and rapidly operated. The shanks 23 and the stud bolts 33 are quite important since they provide a simple and ready attaching means.

In Figs. 6, 7 and 8 I have shown a modified form of tractor hitch. The mounting beam 10 and the head beam 11 and the elements thereof are substantially the same as in the first form and the same reference numerals are used where the parts are substantially duplicates of like parts in Figs. 1 to 5 inclusive. The swing link 25' is pivoted at its rear end in a bracket 40 mounted on the differential housing B' of the tractor A', otherwise it is substantially the same as in Figs. 1 and 2.

Offset lifting arms or actuating links 41 have their lower inner ends pivoted on studs 42 carried at the ends of the draw bar D of the tractor. The upper outer ends of the arms are attached to the shanks 23 by means of the bolts 33. The upper ends of the arms carry ball sockets 37' similar to the sockets 37, the stabilizer links 38 being omitted. The housing B' has a pair of lever arms 43 mounted on a rock shaft E. Angular hangers 44 are pivoted on the outer ends of suspended adjustable links 45, the lower ends of which are pivoted to the medial portions of the arms 41. When the lever arms 43 are swung upwardly the links 45 will swing the lifting arms 41 upwardly, whereby the beams 10 and 11 will be raised from the position shown in full lines in Fig. 7 to the position shown in dotted lines.

What I claim and desire to secure by Letters Patent is:

1. A dumping rake including, a first elongate transverse supporting member having rake tines extending rearwardly therefrom, a second elongate transverse supporting member extending parallel to the first member and having stripper rods extending rearwardly therefrom, the first and second supporting members being movably connected to one another for arcuate swinging of one of the supporting members with respect to the other in an arcuate path having its axis extending parallel to the longitudinal axes of the two supporting members, a first actuating link having its front end arranged for pivotal attachment to a tractor and having its rear end rigidly attached to one of the supporting members whereby vertical swinging of the first link causes vertical swinging of the latter supporting member, a second actuating link having its front end arranged for pivotal attachment to a tractor in a horizontal plane displaced vertically from the horizontal plane of attachment of the first link to the tractor, the rear end of the second link being pivotally attached to the other of said supporting members in a horizontal plane displaced vertically from the horizontal plane passing through the axis of the arcuate path of swinging of one of the supporting members with respect to the other, and displaced vertically from the horizontal plane of attachment of the first link to the supporting member attached thereto, the links relatively crossing one another in vertical planes whereby the forward end of one link is above the forward end of the other link and the rearward end of the latter link is above the rearward end of the former link, and means for applying a lifting force and swinging one of the links vertically.

2. A dumping rake including, a first elongate transverse supporting member having rake tines extending rearwardly therefrom, a second elongate transverse supporting member extending parallel to the first member and having stripper rods extending rearwardly therefrom, the first supporting member being pivotally connected to the second supporting member for arcuate swinging of the first supporting member with respect to the second member in an arcuate path having its axis extending parallel to the longitudinal axes of the two supporting members, a first actuating link having its front end arranged for pivotal attachment to a tractor and having its rear end rigidly attached to the second supporting member whereby vertical swinging of the first link causes vertical swinging of the second supporting member, a second actuating link having its front end arranged for pivotal attachment to a tractor in a horizontal plane displaced vertically from the horizontal plane of attachment of the first link to the tractor, the rear end of the second link being pivotally attached to the first of said supporting members in a horizontal plane displaced vertically from the horizontal plane passing through the axis of the arcuate path of swinging of the first supporting members with respect to the second supporting member, and displaced vertically from the horizontal plane of attachment of the first link to the second supporting member, the links relatively crossing one another in vertical planes whereby the forward end of one link is above the forward end of the other link and the rearward end of the latter link is above the rearward end of the former link, and means for applying a lifting force and swinging one of the links vertically.

3. A dumping rake as set forth in claim 1, having a pair of the actuating links to which the last-named means applies a lifting force.

4. A dumping rake as set forth in claim 1, and stabilizer links having front ends arranged to be pivotally attached to a tractor and having their rearward ends pivotally attached to one of the supporting members.

5. A dumping rake as set forth in claim 1, wherein the first actuating link has its rear end rigidly attached to one of the supporting members by being pivotally connected thereto and by being associated with means for holding the link against pivotal movement with respect to the supporting member.

6. A dumping rake as set forth in claim 1, wherein the first actuating link has its rear end rigidly attached to one of the supporting members by being pivotally connected thereto and by being associated with means for holding the link against pivotal movement with respect to the supporting member, said latter means comprising a shank rigidly extending from the supporting member and having a U-shaped shackle embracing the link to hold the link against pivotal movement.

JOHNNIE C. COLLINS.

References Cited in the file of this patent

UNITED STATES PATENTS

| Number | Name | Date |
| --- | --- | --- |
| 2,320,141 | Kott | May 25, 1943 |
| 2,356,231 | Ferguson | Aug. 22, 1944 |
| 2,366,234 | Blaydes | Jan. 2, 1945 |
| 2,413,807 | Warne | Jan. 7, 1947 |
| 2,475,908 | McCleskey | July 12, 1949 |